(12) United States Patent
Larcom

(10) Patent No.: US 8,478,708 B1
(45) Date of Patent: Jul. 2, 2013

(54) SYSTEM AND METHOD FOR DETERMINING RISK POSED BY A WEB USER

(75) Inventor: Brenda Larcom, Santa Clara, CA (US)

(73) Assignee: Zscaler, Inc., San Jose, CA (US)

( * ) Notice: Subject to any disclaimer, the term of this patent is extended or adjusted under 35 U.S.C. 154(b) by 944 days.

(21) Appl. No.: 12/512,970

(22) Filed: Jul. 30, 2009

(51) Int. Cl.
*G06F 9/44* (2006.01)
(52) U.S. Cl.
USPC .................. 706/52; 726/23; 726/25; 713/182
(58) Field of Classification Search
USPC ........................... 706/52; 726/23–25; 713/182
See application file for complete search history.

(56) References Cited

U.S. PATENT DOCUMENTS 7,490,356 B2 * 2/2009 Lieblich et al. .................. 726/25
7,895,448 B1 * 2/2011 Satish ............................ 713/188
2006/0020814 A1 * 1/2006 Lieblich et al. ................ 713/182
2010/0125911 A1 * 5/2010 Bhaskaran ....................... 726/23

* cited by examiner

*Primary Examiner* — Kakali Chaki
*Assistant Examiner* — Mai T Tran
(74) *Attorney, Agent, or Firm* — Clements and Bernard PLLC; Lawrence A. Baratta, Jr.; Christopher L. Bernard

(57) ABSTRACT

A system and method for determining the risk posed by a web user. The web user can be an individual, a department, a location, or an organization. The method includes the steps of capturing user generated web actions, and classifying the web actions under zero or more risk criteria. The risk criteria include one or more risk calculating and weighting factors. The method further includes the steps of calculating risk scores for the classified risk criteria, combining the calculated risk scores to obtain a total risk score, assigning a qualitative value to the total risk score, and reporting the total risk score. The reported total risk score can be used to enforce security policies based on the value of the risk scores.

20 Claims, 3 Drawing Sheets

SYSTEM AND METHOD FOR DETERMINING RISK POSED BY A WEB USER

TECHNICAL FIELD

This disclosure generally relates to user risk indices and more specifically relates to risk indices for calculating the risk posed by a user's web behavior.

BACKGROUND

In the last decade, Internet related technologies have advanced in leaps and bounds, but this advance has also led to growth in malicious and illegal activity on the internet, making organizations increasingly vulnerable to threats from hackers and viruses, and even from their own staffs. Internet security has become a paramount concern for organizations, and failing to secure systems and manage employee usage of the internet exposes the organization to great risk—risk of a damaged reputation, risk of system damage, and risk of losing business. Most enterprises implement at least some basic security measures by using multiple security systems at the network edge of the enterprise, e.g., firewalls, gateway security agents, intrusion detection and prevention systems, or software security systems in each computing device. These security measures, however, require regular updating and cannot protect organizations from all possible threats.

Further, most organizations install applications that inhibit employee web browsing. These applications block or restrict access to certain websites based on defined security policies. For example, some applications block websites that contain specific words such as 'cars', 'entertainment', 'download', 'torrent', and so on, while other applications block previously determined malicious websites, such as phishing sites, illegal downloading sites, and so on. With all these applications and measures in place, it is still possible for employees to access websites that might have a detrimental effect on the organization.

To monitor employee web behaviour, security administrators oftentimes use applications that record and report user generated web activity. These applications, however, neither perform any calculation on the recorded data nor provide any intelligence. Administrators must perform the tedious task of examining stacks of reports to detect any vulnerability introduced by the user generated web activity, determine how detrimental the web activity can be for the organization, and implement corrective measures based on the detection.

Therefore, it would be desirable to have a method and system that can calculate the risk posed by a user based on the user's web activity and a set of predetermined criteria.

SUMMARY

The subject matter described in this specification is directed to systems and methods for determining the risk posed by a web user.

One embodiment of the disclosure is a method for assessing the risk posed by a web user. The method includes the steps of assembling a set of risk scores associated with the web user and determining a total risk score for the user over a selected time period. Assembling the risk scores includes capturing one or more web actions taken by the user, computing a risk score for each captured action, and storing the risk score together with selected information about the user and the action. Further, computing a risk score for each action includes assigning the action to zero or more criteria, the criteria having associated risk calculating and weighting factors, and applying the calculating and weighting factor to obtain the risk score.

Another embodiment of the disclosure is a system for assessing the risk posed by a web user, the system comprising a traffic-capturing module configured to detect one or more web actions taken by the user. The system further comprising a classification module for assigning the action to zero or more risk criteria. Each risk criterion having one or more risk calculating and weighting factors. A computing agent computes a risk score for each detected action by applying the calculating and weighting factors, and determines a total risk score based on the risk score for each detected action. Moreover, the system includes an analyzing module configured to assign a risk value to the total risk score and a reporting agent configured to report the risk value associated with the user.

BRIEF DESCRIPTION OF THE DRAWINGS

Like reference numbers and designations in the various drawings indicate like elements.

DETAILED DESCRIPTION

Figure 1:
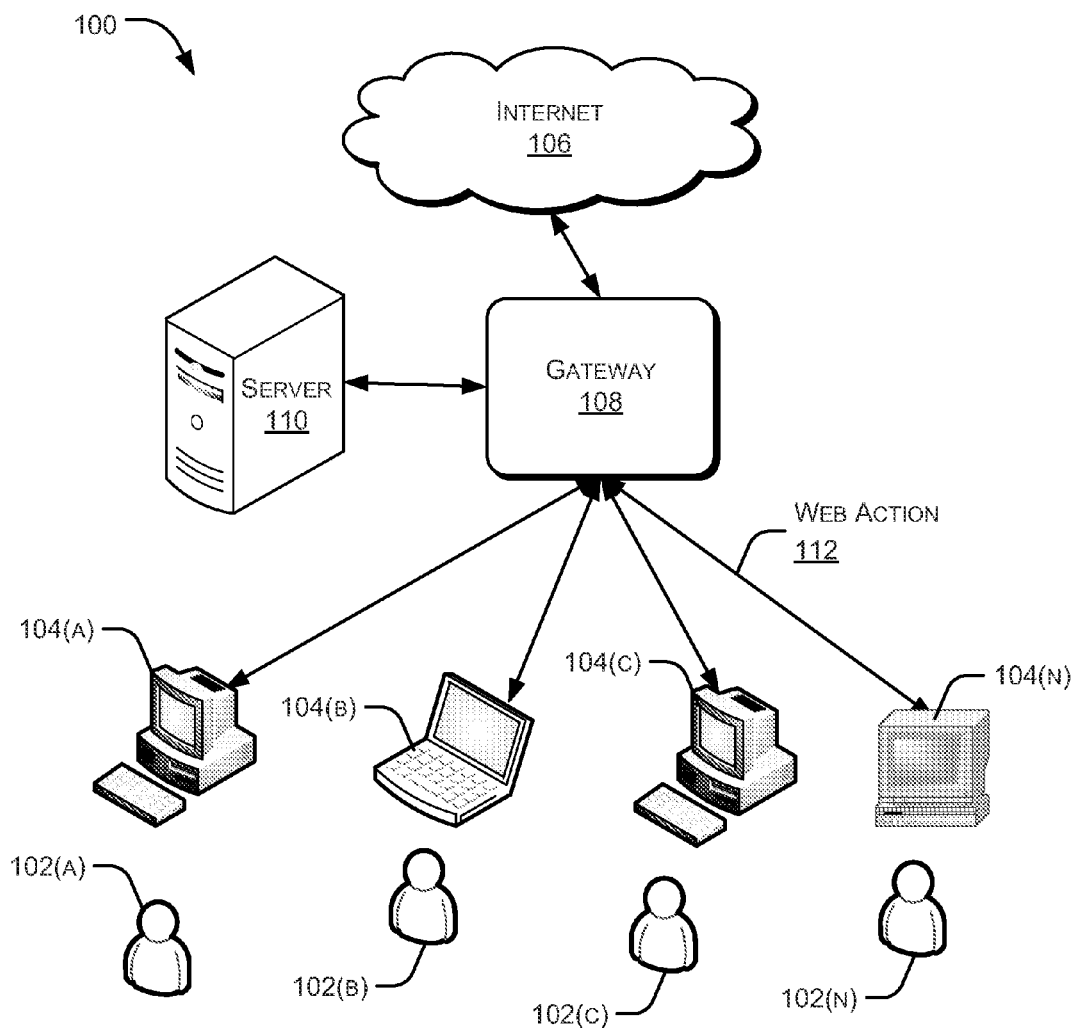
FIG. 1 is a block diagram of an exemplary operating environment for determining the risk posed by a web user according to some embodiments of the present disclosure.

The following detailed description is made with reference to the figures. Preferred embodiments are described to illustrate the claimed invention, not to limit its scope, which is defined by the claims. Those of ordinary skill in the art will recognize a number of equivalent variations on the description that follows.

The following terms are used throughout this document and are defined here for clarity and convenience.

Web action: Any web related data sent or received by users. Examples of web actions can include search queries initiated by a user on a web engine, website requests, music or video downloads, uploads, sending or receiving cookies, and so on.

Web action data: The data associated with web actions. Examples of web action data include web request data, IP address of requested data, name of user, user's IP address, MAC address, time of request, date of request, action taken by the gateway (such as block the site or restrict access), and user department.

Risk criteria: List of broad action categories into which web actions are classified. A web action can be classified under multiple risk criteria, such as browsing with vulnerable software, intentionally browsing with non-IT-approved software, browsing with unknown software, attempting to evade policy enforcement, reusing passwords, and sharing accounts. More examples include visiting phishing sites, vulnerability to phishing, visiting malware sites, attempting to download infected files, downloading infected files, visiting sites in categories that tend to host malware, primarily visiting sites in categories that tend to host malware, and visiting sites in countries that tend to host malware. Others include indiscriminate software installation, high traffic browsing, visiting infrequently accessed sites, indiscriminate browsing, browsing with security-enhancing plug-ins, using anti-virus software, applying patches automatically, password quality, timely applying security patches, uploading infected file, attacking other machines, and accessing botnets.

Internal Risk Category: A number of user defined categories into which risk criteria are classified. The internal categories can be used to reveal gaps in risk criteria coverage and thereby assist in devising new criteria. For example, the internal categories can include risky behavior, security-conscious behavior, security relevant behavior, and signs of infection among others. Risky Behavior includes any behavior that puts a user at risk, such as visiting phishing sites; while security conscious behavior includes anything that reduces the user's risk, such as timely application of patches. Security relevant behavior includes anything that could raise or lower the user's risk, depending on how the action is implemented, while signs of infection can indicate that a user's machine is infected.

External Risk Categories: A list of user defined non-overlapping categories into which risk criteria are classified. Since these risk categories are non-overlapping, each risk criterion can fit into only single corresponding external risk category. The external risk categories can be vulnerability, risky or malicious behavior, and potentially inadequate precautions, among others. Vulnerability includes browsing with vulnerable software, risky behavior includes visiting malware sites and phishing sites, attempting to download or upload infected files, accessing botnet C&C, and so on. Potentially inadequate precautions can include untimely application of security patches.

Overview

Administrators may want to implement more restrictive or more attentive security policies for users with riskier Internet habits. To this end, the present disclosure describes a system and method for assessing the risk posed by a web user. Based on the determined risk, administrators can set streamlined security policies for users based on their risk scores. The web user can be an individual, a department, staff at a particular location, the entire organization, and so on. The claimed method generates a user risk index, which indicates the level of risk associated with the user. Using offline processing, the system identifies some risky user web behavior and possible signs of infection, and based on the identified risky web behavior and signs of infection, the system calculates a user risk index.

The system calculates a user risk index for any time interval or period. For example, a user's risk index can be calculated for an interval of an hour, a day, a week, a month, or a year, and the risk index can be calculated for previous periods such as for the month of February in the previous year. To this end, the system assigns a score to each user, based on the user's web activity in that time interval or period, which can assist organizations to take corrective measures. The web behavior is classified under zero or more predefined risk criteria and each risk criterion is assigned one or more risk scores. The system sums the scores accrued by a user and calculates a total risk score for each user. In one implementation, a total risk score is calibrated on a scale of one to hundred. Alternately, the total risk score can be adjusted on a scale of one to ten or any other scale without departing from the scope of the present disclosure.

Exemplary Environment

FIG. 1 illustrates an exemplary environment 100 for computing risk associated with a web user. The environment 100 includes one or more users 102(a)-(n) (users 102). The users 102 each operate one or more assigned computing devices 104(a)-(n) (computing devices 104). Moreover, the environment 100 can include any number of computing devices 104. It will be appreciated that the computing devices 104 form constituent computing devices in a private network. Examples of such a private network include internal networks to which the computing devices 104 are connected. For example, in one implementation, environment 100 can be an organizational network, including thousands of office PCs, laptops, notepads, mobile devices, various servers, and other computing-based devices spread throughout several countries or locations. Alternately, in another possible implementation, the environment 100 can include a small sized organization with a few users.

Further, the computing devices 104 communicate with the Internet 106 through a gateway device 108. Any web actions, such as web action(s) 112 taken by the users 102 reach the Internet 106 through the gateway device 108. Typically, gateway devices provide preliminary protection to private networks; for example, most gateway devices come with built-in firewalls, packet filtering routers, intrusion detection, and antivirus software. The gateway device 108 could be, but is not limited to, routers, firewalls, and internet gateways. Internet gateways generally stop spam, combat web-based malware, block access to malicious sites, and provide a layer of protection against blended threats, spyware, and targeted attacks. The detailed workings of the gateway device 108 are not described here as such devices are extensively documented in the art. Moreover, it will be appreciated by a person skilled in the art that any known Internet gateways can be utilized without departing from the scope of the present disclosure.

The gateway device 108 is operatively coupled to a server computing device 110 (hereafter referred to as server 110), which receives web action data captured by the gateway device 108. The server 110 can receive the web action data in real time, store this information, analyzed it, and generate a risk score. The functions of the server 110 will be described in detail with reference to FIGS. 2 and 3.

In one implementation, the users 102 can be individuals. Alternately, the users 102 can be one or more staff members in a particular department of an organization. For example, all the staff members in the human resources department can be considered as a single user, and the web actions 112 generated by the staff in the human resources department can be treated as if they were generated by a single user. In this manner, the server 110 can provide a total risk score for the human resources department. Similarly, risk scores can be determined for each department in an organization, based on web behavior of the staff in the respective departments. These risk scores can aid security administrators in analyzing web behavior trends, over a period, in a particular department. For example, if one department seems to be riskier than the other departments, then the riskier department can be singled out and corrective measures can be taken or the root cause of the risky behavior can be unearthed.

Similarly, for organizations that include departmental offices in more than one location, a user related risk analysis can be carried out on a location level, i.e., web actions 112 from each location are analyzed and a risk score is calculated for each location separately. Based on this analysis, security administrators can determine the riskiest location, re-evaluate the security measures adopted for that location, and implement additional security measures to prevent the vulnerabilities introduced by the risky behavior of the staff. Finally, an organization-level risk analysis can be conducted and a risk score can be assigned to the entire organization to assess the security policies followed by the organization, determine the loopholes in the policy, and introduce new security policies based on the results of the risk analysis.

Exemplary Server Computing Device

Figure 2:
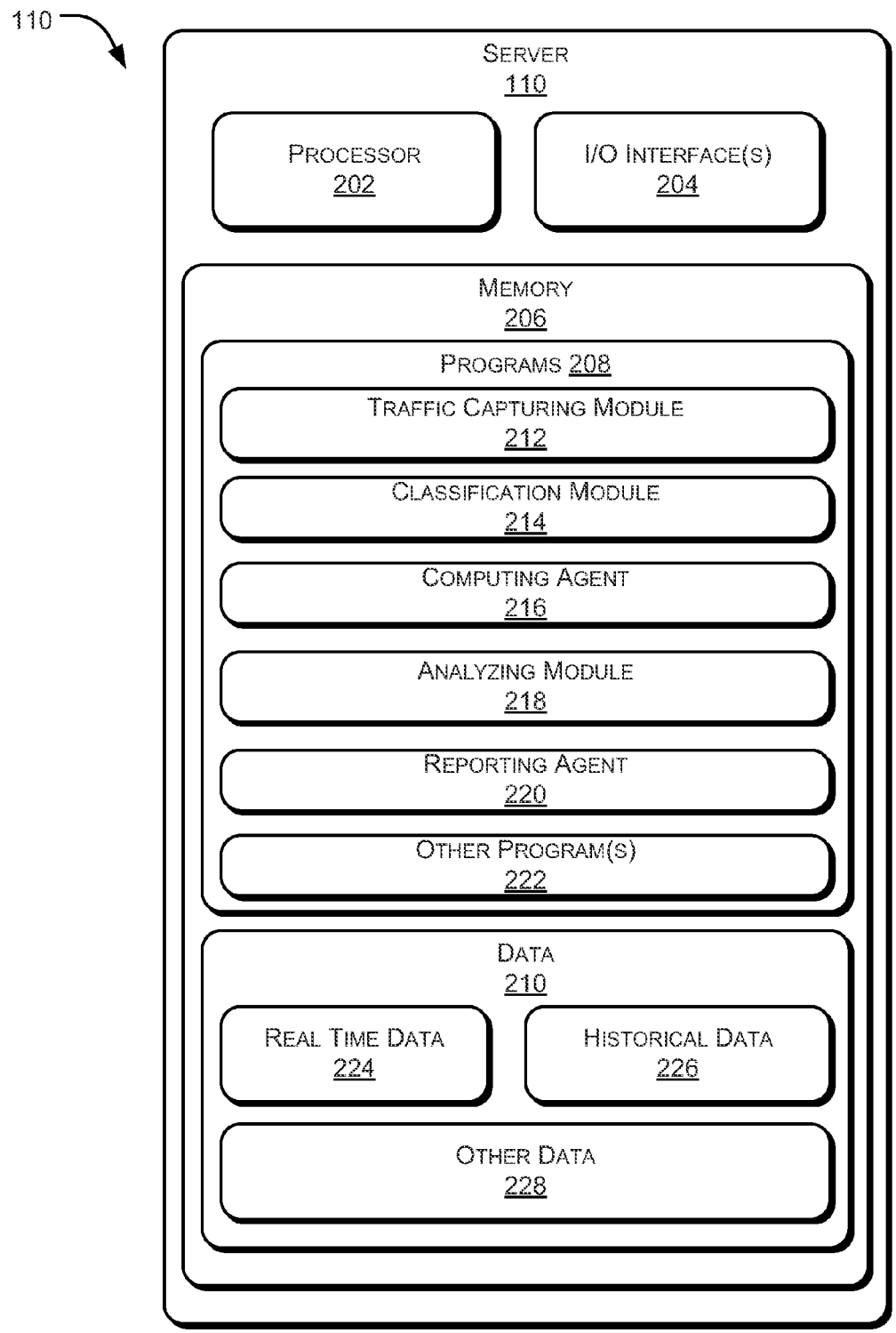
FIG. 2 is a block diagram of an exemplary computing device for determining the risk posed by a web user according to some embodiments to the present disclosure.

FIG. 2 illustrates an exemplary server for determining the risk posed by a web user. The server 110 processes web action data to compute a risk score for a user, such as users 102. Further, the server 110 assigns qualitative values to the risk scores and generates reports that provide information related to the risk scores and the qualitative values. To this end, the server 110 includes one or more processor(s) 202, input/output interfaces 204, and a memory 206. Processor(s) 202 may include microprocessors, microcomputers, microcontrollers, digital signal processors, central processing units, state machines, logic circuitries, and/or any other devices that manipulate signals based on operational instructions. Among other capabilities, processor(s) 202 are configured to fetch and execute computer-readable instructions stored in the memory 206. The I/O interface 204 facilitates communication between the server 110 and any device operatively coupled to it. For example, the I/O interface 204 allows users 102 or the gateway device 108 to input information to the server 110 or allows data and control signals to be transferred from the server 110 to one or more output devices, such as the gateway device 108, a monitor, a printer, and so on.

Memory 206 can include any computer-readable medium known in the art including, for example, volatile memory (RAM) and/or non-volatile memory (flash). As illustrated in FIG. 2, memory 206 also can include program(s) 208 and data 210. The Program(s) 208 include, for example, a traffic-capturing module 212, a classification module 214, a computing agent 216, an analyzing module 218, a reporting agent 220, and other program(s) 222. Other programs(s) 222 include programs that supplement applications on any computing based device such as process receiving applications, update applications, and the like.

Data 210 includes information stored and used by one or more of the program(s) 208, or data generated as a result of the execution of any one of the program(s) 208. For example, real time data 224 is the web action data transferred by the gateway device 108 to the server 110. The server 110 transfers this data to the historical data 226 once the real time data 224 has been analyzed and a risk score has been calculated. In another implementation, the real time data 224 can be transferred to the historical data 226 upon expiration of a predetermined time, such as an hour, a day, a week, or a month. Data 210 also includes other data 228, which includes data related to the applications; for example, other data 228 can include risk criteria, risk categories, intermittent data used while computing risk scores and so on. The following sections describe the functionality of each of the programs in detail.

The traffic-capturing module 212 receives web action data from the gateway device 108 and transmits this data either to the memory 206 as real time data 224 or to the classification module 214 for further processing. Further, the traffic-capturing module functions either in real time or at predefined intervals of time such as every ten minutes, thirty minutes, every hour, or every day. Security administrators can determine the most suitable time based on a number of criteria, such as the size of the organization, number of employees, amount of web activity, etc.

The classification module 214 receives the web action data from either the traffic-capturing module 212 (in real time) or receives real time data 224 from the memory 206, in case the classification module 214 operates at predetermined times. Further, when the risk scores for a particular period are calculated, the classification module 214 receives historical data 226 corresponding to that period. The classification module 214 classifies the web actions 112 under zero or more risk criteria. Security administrators in an organization can decide a number of risk criteria against which they want to measure the web behavior of their staff. The classification module 214 compares the user generated web actions 112 with the decided upon list of risk criteria to assign the web action 112 to zero or more risk criteria.

In one implementation, the classification module 214 compares each web action 112 with every risk criteria. Whenever, the classification module 214 encounters a match, the web action 112 is assigned to the matched risk criteria. For instance, each risk criteria can include a number of 'if-then' statements; so, every time a web action matches an 'if-then' statement associated with a risk criterion, the web action is assigned to that risk criterion. To illustrate this point further, an example is presented. If a user generates a web action 112, such as visiting Wikipedia from a safe browser, the web action may not introduce any vulnerability, and therefore, the web action may not match the 'if-then' statements of any risk criterion and it will not be assigned to any risk criterion. On the contrary, if the user generates a web action 112, such as trying to uploading a virus to a malware site, the web action may fall under multiple risk criteria such as 'visiting a malware site' risk criteria and 'uploading a virus' risk criteria. Further, each risk criteria includes one or more risk calculating and weighting factors that determine the final risk score for the risk criteria. Once the classification module 214 classifies the web actions 112, the classified risk criteria and web action data is provided to the computing agent 216 for further processing.

The computing agent 216 calculates a total risk score for a user. To this end, the computing agent 216 first computes risk scores for each assigned risk criterion and then accrues the individual risk scores to obtain a total risk score for the user 102. The individual risk scores are calculated separately for each user 102 (individual, department, location, organization), using all the web traffic captured or statistically determined to be generated by that user. Depending on the risk calculating and weighting factors, the computing agent 216 assigns a risk score between zero and a maximum value allocated to that criterion. For each user, the risk score for each assigned criterion is added to get a total risk score.

In one implementation, the computing agent 216 also considers the historical data 226 while calculating the risk score. The period for which the historical data 226 is considered, however, can vary based on the risk criterion involved. Further, the risk score assigned to the risk criterion also varies based on the staleness of the historical data 226. For example, while considering phishing sites, 3-month old data can be utilized, and while considering malware sites, 1-month old data is sufficient. The server 110 can determine the period for which each web action 112 is stored before its validity for computing risk scores expires. In one embodiment, the risk calculating and weighting factors decrement according to the staleness of the web actions 112. For example, the more historical a web action 112, the lower the risk calculating and weighting factor. In another implementation, the risk calculating and weighting factors can vary depending on the number of web actions 112 generated by a user. To explain this statement further, an example is presented where user generated web actions are classified under the 'visiting a phishing site' criterion. In this example, if the real time data 224 or the historical data 226 includes 0-5 user web actions corresponding to the 'visiting a phishing site' criterion, then the assigned risk calculating and weighting factor for the criterion can be 5. However, if the real time data or recent historical data includes more than 20 web actions the assigned risk calculating and weighting factor for the criterion becomes 10. Further, if the historical data includes more than 20 web actions all of which are at least 2-3 months old, the assigned risk calculating and weighting factor for the criterion becomes 7.

Moreover, an authorized person can alter or update the risk calculating and weighting factors at any point of time.

Based on the assigned risk calculating and weighting factors, the computing agent 216 calculates a risk score for the risk criteria. In one implementation, the computing agent 216 understood that this table is merely used to illustrate the categorization of the risk criteria under the external and internal risk categories and the risk criteria and categories and not to limit the scope of the present disclosure to the risk criteria and categories listed here.

TABLE 1

Risk criteria with associated internal and external risk categories

| Risk Criterion | Internal Risk Category | External Risk Category |
|---|---|---|
| Browsing with vulnerable software | Risky Behavior | Vulnerability |
| Vulnerability to phishing | Risky Behavior | Vulnerability |
| Visits to phishing sites | Risky Behavior | Risky or Malicious Behavior |
| Visiting malware sites | Risky Behavior | Risky or Malicious Behavior |
| Attempting to download infected files | Risky Behavior | Risky or Malicious Behavior |
| Using anti-virus software on the desktop | Security-Conscious Behavior | Potentially Inadequate Precautions |
| Password quality | Security-Relevant Behavior | Potentially Inadequate Precautions | can calculate the risk scores in specified intervals, such as every half hour, every hour, every day, every week, and so on. The web actions 112 generated by a user in the specified interval are classified under the appropriate risk criteria, and associated risk calculating and weighting factors are applied on the risk criteria, generating risk scores for the risk criteria. The risk scores calculated for the individual risk criteria (that the web actions 112 fall under) are combined and a total risk score value is obtained.

As defined previously, the risk criteria could be classified under one or more external categories. External risk categories aid security administrators to better understand and analyze the risk scores. The organization can identify one or more external risk categories to classify the risk criteria. Once the server 110 generates user-related risk scores, security administrators can easily determine to which risk category the user's web behavior most often pertains. For example, if the user's risk score pertains mostly to inadequate precautions, then the user's computer may require updated security software, or the user can receive instructions about using available security measures more judiciously; alternatively, if the user's risk score pertains mostly to risky or malicious behavior, the organization can issue a serious warning, or adopt stricter policies. Moreover, external risk categories help in improving and enforcing security policies. Another advantage of classifying risk criteria under external risk categories is to allow sophisticated illustration of the risk criteria and help organize the risk criteria in a systematic manner for generating drillable and uncluttered graphs, slides, reports, and so on In another embodiment, the risk criteria are classified under internal risk categories. The internal categories can be used to reveal gaps in risk criteria coverage and thereby assist in devising new criteria. It will be appreciated that the internal and external risk categories described here are merely exemplary and organizations can use any risk categories that seem appropriate. Moreover, the internal and external risk categories are predefined and the security administrators classify the risk criteria in the appropriate risk categories while configuring the server 110. When a new risk criterion is added, the security administrator can assign the criteria to one of the internal or external risk categories and store the new risk criteria along with its associations in the other data 228.

Table 1 depicts exemplary risk criteria with associated exemplary internal and external risk categories. It will be The total risk score calculated by the computing agent 216 along with contributing risk criteria, and risk categories is provided to the analyzing module 218. As stated previously, the total risk score can be a number from zero to hundred. The analyzing module 218 assigns a qualitative value to this total risk score. Policies can be set by administrators to assign the qualitative values. For example, a score from 40 to 60 can be assigned a qualitative value "fairly risky", while a score from 60 to 80 can be assigned a qualitative value "highly risky". Further, the analyzing module 218 analyzes the contributing risk categories and returns values such as "highly risky; mostly risky behavior" or "mildly risky: mostly inadequate precautions", or such. The total risk score along with the qualitative value assigned to the total risk score is provided to the reporting agent 220. One reason for providing a qualitative value is to be able to group users having the same qualitative value and enforce policies on a group of users instead of enforcing policies individually for the users 102.

The reporting agent 220 generates a report indicating the user's total risk score. In one implementation, the reporting agent 220 provides the total risk score per user along with other associated data about the user 102. For example, the report can include information about the user 102, the computing device 104, user's IP address, user's MAC address, user's department and/or location, risk category-wise risk score, criteria-wise risk score, risk score variation over an hour, a day, a week, a month, a year, and so on. Further, the generated report indicates the user's total risk score obtained at the end of each day.

The reporting agent 220 receives risk scores and qualitative risk values from the computing agent 216 and the analyzing module 218 respectively. Real time data 224, historical data 226, and user related information is provided to the reporting agent 220 from the memory 206. The reporting agent 220 combines all the user related risk information and generates a report. Moreover, the report includes drill-down facilities allowing administrators to view per-user risk score along with contributing web actions 112 and risk criteria. In one implementation, the reporting agent 220 generates alerts for high-risk users. These alerts can be provided to the system administrator via email, on a dashboard, or on a web browser. Further, the alerts can be visual, or audio.

The other program(s) 222 can include an enforcing module that executes one or more security policies based on the risk score and associated external risk categories. For example, if the risk score for a department is between 60 and 80, and the risk score indicates mostly risky behavior, the enforcing module can provide limited internet access for the department, until the security administrator implements appropriate security measures.

Exemplary Method

Figure 3:
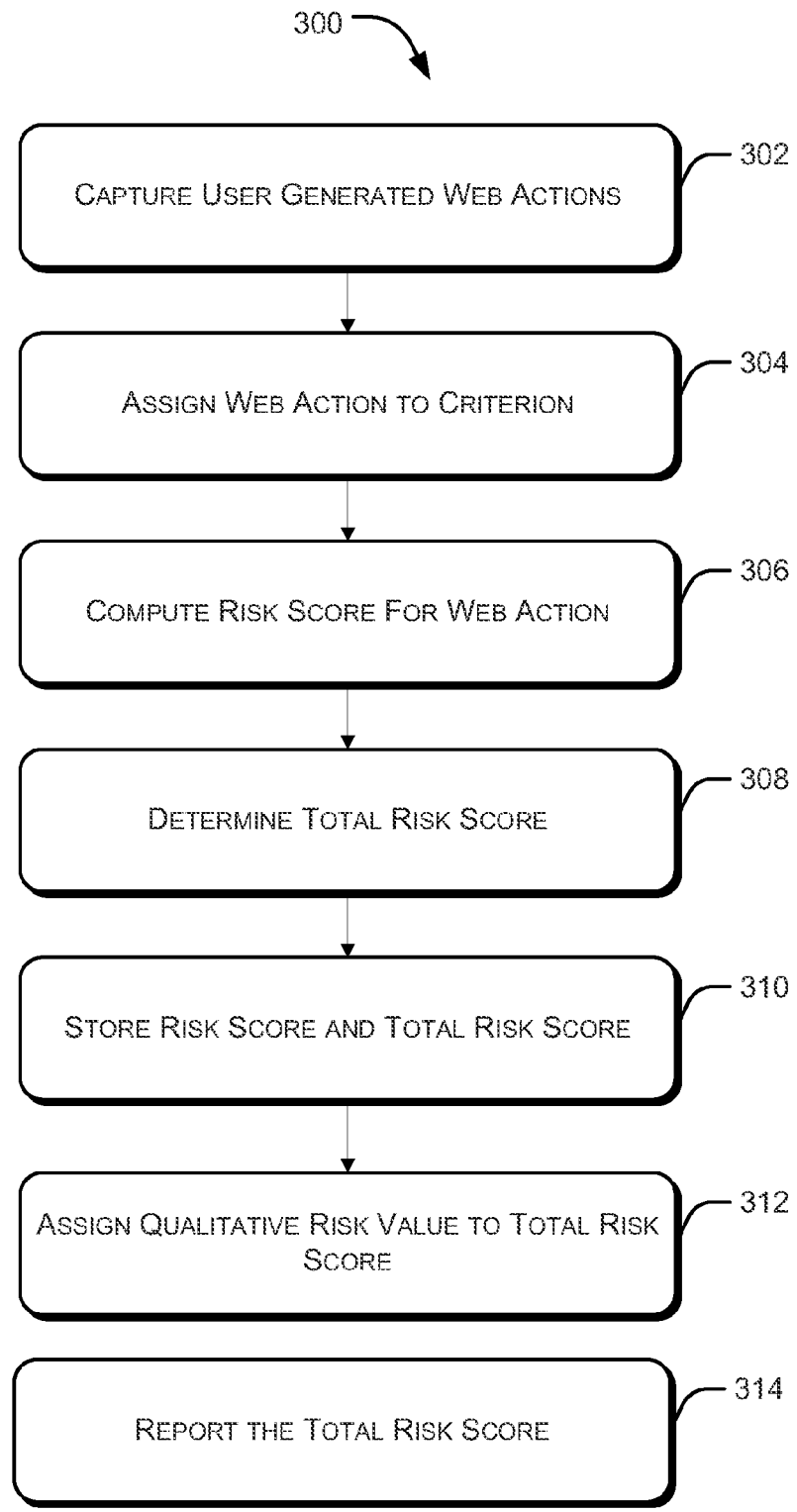
FIG. 3 is a flowchart of an exemplary method for determining the risk posed by a web user.

FIG. 3 is a flow chart depicting an exemplary method for determining the risk posed by a web user. The method includes the steps of capturing user generated web actions, assigning web actions to zero or more risk criteria, computing risk scores for the risk criteria, determining total risk score, storing the risk scores, and assigning a qualitative risk value to the total risk score.

At step 302, user associated web actions 112 are captured. In one implementation, the traffic-capturing module 212 detects all user associated web actions 112 that exit and enter the environment 100 passes through the gateway device 108. The gateway device 108 logs the web actions 112 along with associated user information and forwards this information to the traffic-capturing module 212. The traffic-capturing module 212 can then store this information in the memory 206 for processing at a later predefined time or forward it to the appropriate modules for further processing in real time.

Moving to step 304, the web actions 112 are assigned to zero or more risk criteria. Risk criteria can be a list of predetermined risk factors decided upon by the security administrators of an organization. If a determination is made that a web action 112 is risk free, it is not assigned to any risk criterion; else, the correct assignment is made. In one implementation, the classification module 214 assigns the web actions 112 to appropriate risk criteria. For example, the user 102 can be browsing using the Mozilla® web browser. This web action 112 can be classified under a risk criterion such as 'browsing with vulnerable software'. Further, the classification module 214 can classify a web action 112 under multiple risk criteria. To this end, the classification module compares each web action 112 with every risk criteria. Every time a match is encountered, the web action is assigned to the matched risk criterion.

At step 306, risk scores for the assigned risk criteria are calculated, by the computing agent 216 or by a similar, suitable device. The risk criteria have associated calculating and weighting factors, which include values on a scale from zero to a maximum value. Depending on the type of web action 112, the severity of the risk posed by the web action 112, and the number of web actions 112 classified under a risk criterion, the value of the risk score varies, even for the same risk criterion. For example, if a user browses 20 unique sites in half an hour, then the 20 web actions 112 can be classified under risk criteria such as high traffic browsing and 'indiscriminate browsing'. The risk scores assigned to these two criteria vary depending on the number of websites visited for a specified time, such as half an hour or a day. So, for a user visiting 20 unique websites in half an hour, the risk score for 'indiscriminate browsing' can be 5, while for a user browsing 40 unique sites in half an hour, the risk score can creep up to 10-15. The security administrators can set the risk calculating and weighting factor scales to any predetermined value. In a preferred embodiment, the risk calculating and weighting factors positively contribute towards the risk score as positive values of the risk calculating and weighting factors ease reporting the scores.

In addition, the computing agent 216 also utilizes the historical data 226 in determining the risk scores. The risk scores can incorporate web action data from intervals (such as a month or three months in most cases) before the selected duration, to provide a hysteresis effect. Older data can slowly have less and less of an effect on the risk score until its effect completely fades out. For example, in the previous scenario, the number of sites visited by the user 102 in the past three months would also be considered while calculating the risk score. If the user 102 has reduced the average number of sites visited per day recently, then the user's risk score does not decline sharply but gradually. However, if the user 102 maintains the low daily average for a long duration, the user's risk score decreases evidently.

A total risk score is determined at step 308. The computing agent 216 collates the risk criterion scores for a user, to obtain the total risk score. In one embodiment, the total risk score is a positive number between zero and hundred—the higher the total risk value, the higher the risk posed by the user.

At step 310, the individual risk scores and the total risk scores for a user are stored in the memory 206 for later processing. In addition, a qualitative value is assigned to the total risk score at step 312. The analyzing module 218 assigns the qualitative values based on a set of policies. For example, the qualitative values can be 'borderline risky', 'fairly risky', 'very risky', 'very risky: take immediate action', and so on. One reason to assign qualitative values to the total risk score is to allow policy enforcement for a group of user based on their qualitative value, instead of enforcing policies on an individual basis.

Moving to step 312, the method 300 reports the total risk score along with the qualitative value. In one implementation, the reporting agent 220 generates reports hourly, daily, weekly, monthly, annually, and so on. The report can include the risk values for all users 102 in a department, in a location, in the organization and so on. Further, the report can be generated separately for departments or locations. Moreover, reports can compare the risk scores of individuals, departments, locations, and such. The generated reports include drill-down facility, allowing administrators to drill-down to view the contributing factors, such as web actions 112, risk criteria, risk categories, and so on. The reporting step can also include generating alerts, indicating users with exceptionally high-risk values. The reporting agent 220 forwards these alerts to system administrators on dashboards, via emails, and so on. Further, the reporting agent 220 can forward these alerts to the top management of the organization for immediate policy enforcement.

The method can also include a step of enforcing security measures based on the total risk score and the external risk categories (step not shown in FIG. 3). For example, if the risk score for a location is between 60 and 80, and the risk score indicates mostly inadequate precautions, the enforcing module can advice usage of better anti-virus software, send reminders to apply patches, and so on.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, for example, a machine generated electrical, optical, or electromagnetic signal generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this disclosure, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not include such devices.

Embodiments of the subject matter described in this specification can be implemented in a computing system that includes a back end component, for example, as a data server, or that includes a middleware component, for example, an application server, or that includes a front end component, for example, a client computer having a graphical user interface or a Web browser through which a user can interact with an implementation of the subject matter described is this specification, or any combination of one or more such back end, middleware, or front end components. The components of the system can be interconnected by any form or medium of digital data communication, for example, a communication network. Examples of communication networks include a local area network ("LAN") and a wide area network ("WAN"), for example, the Internet.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications, and variations to the examples without departing from the scope of the claimed invention.

I claim:

1. A method for assessing the risk posed by a web user, comprising the steps of:
   assembling a set of risk scores associated with the web user, including capturing one or more web actions taken by the user;
   computing a risk score for zero or more risk criteria, including assigning the web action to zero or more risk criteria, the risk criteria having one or more associated risk calculating and weighting factor; and
   applying the calculating and weighting factor to obtain the risk score and using historical data from various intervals prior to a duration of the one or more web actions to provide a hysteresis effect with older data having less effect over time on the risk score; and
   storing the risk score together with selected information about the user and the web action; and
   determining a total risk score for the user over a selected time period;
   wherein the risk criteria is segmented between external risk categories and internal risk categories, wherein the internal risk categories are utilized to reveal gaps in coverage of the risk criteria to assist in developing new criteria for the risk criteria and the external risk categories are utilized to enforce security measures with the risk score.

2. The method of claim 1, further comprising assigning a qualitative risk value to the total risk score for the user.

3. The method of claim 1, further comprising reporting the total risk score for the user.

4. The method of claim 3, wherein the reporting step includes generating a report displaying the total risk score for the user together with the selected information about the user and the web action.

5. The method of claim 4, wherein the report includes a drill-down facility to analyze the selected information about the user and the web action.

6. The method of claim 1, wherein the selected time period is one of half an hour, an hour, a day, a week, a month, or a year.

7. The method of claim 1, wherein the risk criteria are classified under at least one external risk category.

8. The method of claim 7, wherein the external risk category includes at least one of vulnerability, malicious behavior, or potentially inadequate precautions.

9. The method of claim 1, wherein the user is one of an individual, a department, a location, or an organization.

10. The method of claim 1 further comprising executing one or more security policies based on the total risk score.

11. The method of claim 1, where the risk criteria comprise:
browsing with vulnerable software; browsing with non-approved software; browsing with unknown software; evading policy enforcement; reusing passwords; sharing accounts; visiting phishing sites; vulnerability to phishing; visiting malware sites; attempting to download infected files; downloading infected files; visiting sites known to host malware; indiscriminate software installation; high traffic browsing; visiting infrequently accessed sites; indiscriminate browsing; browsing with security enhanced plug-ins; using anti-virus software; applying patches automatically; password quality; timely applying security patches; uploading infected files; attacking other machines; and accessing botnets.

12. A system for assessing the risk posed by a web user, the system comprising:
a traffic-capturing module executed on a server configured to detect one or more web actions taken by the user;
a classification module executed on the server configured to assign the web action to zero or more risk criteria, the risk criteria having associated risk calculating and weighting factors;
a computing agent executed on the server configured to:
compute a risk score for each assigned risk criterion by applying the calculating and weighting factors; and
determine a total risk score based on the risk score for each assigned risk criterion and based on historical data from various intervals prior to a duration of the one or more web actions to provide a hysteresis effect with older data having less effect over time on the risk score;
an analyzing module configured to assign a qualitative value to the total risk score; and
a reporting agent configured to report the risk value associated with the user;
wherein the risk criteria is segmented between external risk categories and internal risk categories, wherein the internal risk categories are utilized to reveal gaps in coverage of the risk criteria to assist in developing new criteria for the risk criteria and the external risk categories are utilized to enforce security measures with the risk score.

13. The system of claim 12, wherein the traffic-capturing module operates in real time.

14. The system of claim 12, wherein the risk criteria is classified under at least one external risk category.

15. The system of claim 14, wherein the external risk category is one of vulnerability, malicious behavior, or potentially inadequate precautions.

16. The system of claim 15 further comprising an enforcing module configured to enforce one or more security policies based on the total risk score and the external risk category.

17. The system of claim 12, wherein the classification module assigns web actions including real time data and historical data to the zero or more risk criteria.

18. The system of claim 12, wherein the computing agent generates the total risk score by combining the risk score computed for each assigned risk criterion.

19. The system of claim 12, wherein the risk value is reported daily.

20. The system of claim 12, wherein the user is one of an individual, a department, a location, or an organization.

* * * * *